US009237258B2

(12) United States Patent
Zalewski

(10) Patent No.: US 9,237,258 B2
(45) Date of Patent: *Jan. 12, 2016

(54) SCHEME FOR DETERMINING THE LOCATIONS AND TIMING OF ADVERTISEMENTS AND OTHER INSERTIONS IN MEDIA

(71) Applicant: Sony Computer Entertainment America LLC, San Mateo, CA (US)

(72) Inventor: Gary M. Zalewski, Piedmont, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/151,536

(22) Filed: Jan. 9, 2014

(65) Prior Publication Data

US 2014/0130084 A1 May 8, 2014

Related U.S. Application Data

(63) Continuation of application No. 13/891,095, filed on May 9, 2013, now Pat. No. 8,665,373, which is a continuation of application No. 11/689,982, filed on Mar. 22, 2007, now Pat. No. 8,451,380.

(51) Int. Cl.
*H04N 5/93* (2006.01)
*H04N 5/14* (2006.01)
(Continued)

(52) U.S. Cl.
CPC .......... *H04N 5/147* (2013.01); *H04N 21/4307* (2013.01); *H04N 21/4316* (2013.01); *H04N 21/44012* (2013.01); *H04N 21/812* (2013.01);
(Continued)

(58) Field of Classification Search
USPC ...................... 348/578, 586–588; 725/32–36, 725/135–136; 375/240.01
See application file for complete search history.

(56) References Cited

U.S. PATENT DOCUMENTS 5,099,322 A 3/1992 Gove
5,953,076 A 9/1999 Astle
(Continued)

FOREIGN PATENT DOCUMENTS

CN 1423896 A 6/2003
EP 1168210 A1 1/2002
(Continued)

OTHER PUBLICATIONS

USPTO; Notice of Allowance & Examiner-Initiated Interview Summary issued in U.S. Appl. No. 14/026,948, mailed Jun. 11, 2014, 8 pages.
(Continued)

*Primary Examiner* — Amir Mehrmanesh
(74) *Attorney, Agent, or Firm* — Fitch, Even, Tabin & Flannery, LLP

(57) ABSTRACT

A method for use with content includes analyzing a sequence of frames of the content, determining whether an area exists in a scene depicted by the sequence of frames where additional content such as advertising can be inserted without obstructing activity in the scene, for any such area, determining an amount of time that the area is available when the sequence of frames is being played, and for any such area, determining a size of the area. A storage medium storing a computer program for causing a processor based system to execute these steps and an apparatus for use with content are also disclosed.

7 Claims, 4 Drawing Sheets

(51) Int. Cl.
H04N 21/43      (2011.01)
H04N 21/431     (2011.01)
H04N 21/44      (2011.01)
H04N 21/81      (2011.01)
H04N 21/858     (2011.01)

(52) U.S. Cl.
CPC ....... *H04N 21/8583* (2013.01); *H04N 21/8586* (2013.01)

(56) References Cited

U.S. PATENT DOCUMENTS

| | | | |
|---|---|---|---|
| 6,297,853 | B1 | 10/2001 | Sharir |
| 6,373,508 | B1 | 4/2002 | Moengen |
| 6,624,853 | B1 | 9/2003 | Latypov |
| 6,954,498 | B1 | 10/2005 | Lipton |
| 7,015,978 | B2 | 3/2006 | Jeffers |
| 7,020,381 | B1 | 3/2006 | Kato |
| 8,151,295 | B1 | 4/2012 | Eldering |
| 8,451,380 | B2 | 5/2013 | Zalewski |
| 8,549,554 | B2 | 10/2013 | Zalewski |
| 8,566,865 | B2 | 10/2013 | Zalewski |
| 8,665,373 | B2 | 3/2014 | Zalewski |
| 8,860,803 | B2 | 10/2014 | Zalewski |
| 8,988,609 | B2 | 3/2015 | Zalewski |
| 9,038,100 | B2 | 5/2015 | Zalewski |
| 2002/0002525 | A1 | 1/2002 | Arai |
| 2002/0027617 | A1 | 3/2002 | Jeffers |
| 2002/0044683 | A1 | 4/2002 | Deshpande |
| 2002/0083439 | A1 | 6/2002 | Eldering |
| 2002/0100042 | A1 | 7/2002 | Khoo |
| 2002/0112249 | A1 | 8/2002 | Hendricks |
| 2003/0028432 | A1 | 2/2003 | Troyansky |
| 2003/0028873 | A1 | 2/2003 | Lemmons |
| 2004/0098753 | A1 | 5/2004 | Reynolds |
| 2004/0193488 | A1 | 9/2004 | Khoo |
| 2004/0194128 | A1 | 9/2004 | McIntyre |
| 2005/0137958 | A1 | 6/2005 | Huber |
| 2006/0155615 | A1 | 7/2006 | Loo |
| 2007/0055986 | A1 | 3/2007 | Gilley |
| 2007/0197287 | A1* | 8/2007 | Shimizu ............... 463/31 |
| 2007/0214476 | A1 | 9/2007 | Zalewski |
| 2007/0220553 | A1 | 9/2007 | Branam |
| 2007/0226761 | A1 | 9/2007 | Zalewski |
| 2007/0279494 | A1 | 12/2007 | Aman |
| 2008/0126226 | A1 | 5/2008 | Popkiewicz |
| 2008/0231751 | A1 | 9/2008 | Zalewski |
| 2010/0228421 | A1 | 9/2010 | DiBernardo |
| 2011/0145856 | A1 | 6/2011 | Agarwal |
| 2011/0321084 | A1 | 12/2011 | Takahashi |
| 2012/0005595 | A1 | 1/2012 | Gavade |
| 2013/0091519 | A1 | 4/2013 | McLauchlan |
| 2013/0242195 | A1 | 9/2013 | Zalewski |
| 2014/0040944 | A1 | 2/2014 | Zalewski |
| 2014/0043364 | A1 | 2/2014 | Zalewski |
| 2014/0156364 | A1 | 6/2014 | Zalewski |
| 2015/0025949 | A1 | 1/2015 | Zalewski |
| 2015/0128171 | A1 | 5/2015 | Zalewski |

FOREIGN PATENT DOCUMENTS

| | | | |
|---|---|---|---|
| EP | 1416727 | A1 | 5/2004 |
| EP | 1463317 | A2 | 9/2004 |
| JP | 2004304792 | A | 10/2004 |
| JP | 2007530978 | A | 11/2007 |
| WO | 9703517 | A1 | 1/1997 |
| WO | 0249351 | A2 | 6/2002 |
| WO | 2005076598 | A1 | 8/2005 |

OTHER PUBLICATIONS

USPTO; Unpublished U.S. Appl. No. 14/175,996, filed Feb. 7, 2014.
Chinese Patent Office, 'Third Office Action' issued in Chinese Patent Application No. 200780016668.3 dated Jan. 31, 2012, 31 pages.
Chinese Patent Office; 'Decision of Rejection' issued in Chinese Patent Application No. 200780016668.3, dated Sep. 5, 2012, 38 pages (includes English translation).
Chinese Patent Office; 'Decision on Rejection' issued in Chinese Patent Application No. 200880009256.1, dated Dec. 5, 2012 (includes English translation), 15 pages.
Chinese Patent Office; 'First Office Action' issued in Chinese Application No. 2007.80016668.3; issued Feb. 12, 2010, 31 pages.
Chinese Patent Office; 'First Office Action' issued in Chinese Patent Application No. 200880009256.1 dated Jun. 5, 2012 (includes English translation), 13 pages.
Chinese Patent Office; 'Fourth Office Action' issued in Chinese Patent Application No. 200780016668.3, dated May 15, 2012, 35 pages (includes English translation).
Chinese Patent Office; 'Second Office Action' issued in Chinese Application No. 2007.80016668.3; dated Mar. 2, 2011, 21 pages.
European Patent Office, Communication pursuant to Article 94(3) EPC' issued in European Patent Application No. 08018364.3 dated Jan. 2, 2012, 7 pages.
European Patent Office, Communication pursuant to Article 94(3) EPC issued in European Application No. 07757929 dated Dec. 5, 2011 (6 pages).
European Patent Office; 'Communication Pursuant to Article 94(3) EPC' issued in European Application No. EP 07 757 929.0 for PCT/US2007/063326; dated Aug. 11, 2010; 1 page.
European Patent Office; 'Communication under Rule 71(3) EPC' issued in European Patent Application No. 08018364.3 dated Jun. 25, 2012, 50 pages.
European Patent Office; 'Decision to grant a European Patent pursuant to Article 97(1) EPC' issued in European Patent Application No. 08018364.3, mailed Nov. 2, 2012, 2 pages.
European Patent Office; 'European Search Report' issued in European Publication No. EP 2046043A3 for EP Application No. 08018364.3; dated Mar. 30, 2010; 3 pages.
European Patent Office; 'Extended European Search Report' issued in European Patent Application No. 12179714.6, mailed Sep. 28, 2012, 8 pages.
European Patent Office; 'Extended European Search Report (including the Supplementary European Search Report and the European Search Opinion)' issued in European Application No. EP 07 757 929.0 for PCT/US2007/063326; dated Apr. 9, 2010; 7 pages.
European Patent Office; 'Extended European Search Report (including the Supplementary European Search Report and the European Search Opinion)' issued in European Application No. EP 08 01 8364.3; dated Apr. 9, 2010; 8 pages.
European Patent Office; "Communication pursuant to Article 94(3) EPC" issued in European Patent Application No. 12179714.6, dated Jan. 7, 2014, 4 pages.
European Patent Office; "Summons to Attend Oral Proceedings Pursuant to Rule 115(1) EPC" issued in European Patent Application No. 07757929.0, dated Feb. 20, 2014, 8 pages.
Japanese Patent Office; 'Decision of Refusal' issued in Japanese Patent Application No. 2008-558491, dated Sep. 25, 2012, 4 pages (includes English translation).
Japanese Patent Office; 'Notification of Reason(s) for Refusal' issued in Japanese Application No. 2008-558491; dated Nov. 15, 2011; 6 pages (including English translation).
Japanese Patent Office; 'Notification of Reasons for Refusal' issued in Japanese Patent Application No. 2012-055357, dated Apr. 16, 2013, 5 pages (includes English translation).
Japanese Patent Office; "Final Notification of Reasons for Refusal" issued in Japanese Patent Application No. 2012-055357, dated Aug. 6, 2013, 4 pages (includes English translation).
Japanese Patent Office; "Final Notification of Reasons for Refusal" issued in Japanese Patent Application No. 2012-055358, dated Aug. 6, 2013, 4 pages (includes English translation).
Japanese Patent Office; "Notification of Reasons for Refusal" issued in Japanese Patent Application No. 2012-055358, dated Apr. 16, 2013, 4 pages (includes English translation).
Japanese Patent Office; Notification of Reasons for Refusal issued in Japanese Patent Application No. 2008-558491; dated May 15, 2012; 4 pages (includes English translation).

(56) References Cited

OTHER PUBLICATIONS

Patent Cooperation Treaty; 'International Preliminary Report on Patentability' issued in PCT/US07/63326; dated Oct. 21, 2008; 8 pages.
Patent Cooperation Treaty; 'International Search Report' issued in PCT/US07/63326; mailed Sep. 3, 2008; 2 pages.
Patent Cooperation Treaty; 'International Search Report' issued in PCT Application No. PCT/US2008/057373, dated May 26, 2008; 2 pages.
Patent Cooperation Treaty; 'Notification of Transmittal of the International Search Report and the Written Opinion of the International Searching Authority or Declaration' issued in PCT/US07/63326; mailed Sep. 3, 2008; 2 pages.
Patent Cooperation Treaty; 'Notification of Transmittal of the International Search Report and the Written Opinion of the International Searching Authority or the Declaration' issued in PCT Application No. PCT/US2008/057373, dated Jul. 1, 2008; 2 pages.
Patent Cooperation Treaty; 'Written Opinion of the International Searching Authority' issued in PCT/US07/63326; mailed Sep. 3, 2008; 7 pages.
Patent Cooperation Treaty; 'Written Opinion of the International Searching Authority' issued in PCT Application No. PCT/US2008/057373, dated May 26, 2008; 7 pages.
Patent Cooperation Treaty; "International Preliminary Report on Patentability" issued in PCT/US2008/057373; dated Sep. 22, 2009; 6 pages.
USPTO, Final Office Action issued in U.S. Appl. No. 11/689,982, mailed Dec. 9, 2011, 11 pages.
USPTO, Office Action issued in U.S. Appl. No. 11/371,367 mailed Mar. 22, 2012, 15 pages.
USPTO; 'Non-final Office Action, Supplemental' issued in U.S. Appl. No. 11/371,367, mailed Jul. 29, 2008; 13 pages.
USPTO; Advisory Action issued in U.S. Appl. No. 11/371,215, mailed Jun. 19, 2009; 3 pages.
USPTO; Advisory Action issued in U.S. Appl. No. 11/689,982, mailed Feb. 27, 2012, 3 pages.
USPTO; Applicant-Initiated Interview Summary issued in U.S. Appl. No. 11/689,982, mailed Dec. 14, 2012, 5 pages.
USPTO; Final Office Action issued in U.S. Appl. No. 11/371,215, mailed Apr. 5, 2012,13 pages.
USPTO; Final Office Action issued in U.S. Appl. No. 11/371,215, mailed Mar. 4, 2009; 11 pages.
USPTO; Final Office Action issued in U.S. Appl. No. 11/371,367, mailed Oct. 11, 2012, 6 pages.
USPTO; Final Office Action issued in U.S. Appl. No. 11/371,367; dated Mar. 16, 2010, 12 pages.
USPTO; Final Office Action issued in U.S. Appl. No. 11/371,367; mailed Feb. 2, 2009; 16 pages.
USPTO; Final Office Action issued in U.S. Appl. No. 11/689,982, mailed Oct. 16, 2012, 15 pages.
USPTO; Interview Summary issued in U.S. Appl. No. 11/371,367; mailed Oct. 27, 2008; 2 pages.
USPTO; Notice of Allowance & Examiner-Initiated Interview Summary issued in U.S. Appl. No. 13/891,095, mailed Oct. 7, 2013, 21 pages.
USPTO; Notice of Allowance issued in U.S. Appl. No. 11/371,215, mailed Jun. 13, 2013, 8 pages.
USPTO; Notice of Allowance issued in U.S. Appl. No. 11/371,367, mailed Jan. 15, 2013, 5 pages.
USPTO; Notice of Allowance issued in U.S. Appl. No. 11/371,367, mailed May 28, 2013, 6 pages.
USPTO; Notice of Allowance issued in U.S. Appl. No. 11/689,982, mailed Jan. 31, 2013,14 pages.
USPTO; Office Action issued in U.S. Appl. No. 11/371,367; mailed Jul. 27, 2009; 9 pages.
USPTO; Office Action issued in U.S. Appl. No. 11/371,215, mailed Sep. 10, 2008; 11 pages.
USPTO; Office Action issued in U.S. Appl. No. 11/371,215, mailed Sep. 10, 2009; 10 pages.
USPTO; Office Action issued in U.S. Appl. No. 11/371,215; mailed Jul. 22, 2011, 12 pages.
USPTO; Office Action issued in U.S. Appl. No. 11/371,215; mailed Mar. 29, 2010, 10 pages.
USPTO; Office Action issued in U.S. Appl. No. 11/689,982, mailed Apr. 5, 2012, 15 pages.
USPTO; Office Action issued in U.S. Appl. No. 11/689,982; mailed Jun. 20, 2011, 14 pages.
USPTO; Office Action issued in U.S. Appl. No. 14/026,948, mailed Dec. 11, 2013, 9 pages.
USPTO; Office Action issued in U.S. Appl. No. 11/371,367; dated Jul. 20, 2011; 12 pages.
USPTO; Office Action issued in U.S. Appl. No. 11/371,367 dated Jul. 16, 2008; 13 pages.
Wang, Yang et al. 'Estimation of multiple directional light sources for synthesis of augmented reality images.' CS Dep't, SUNY Stony Brook, 2003. http://www.cs.sunysb.edU/vislab/wordpress//papers/GM2003.pdf.
European Patent Office; "Decision to refuse a European Patent application" issued in European Patent Application No. 07757929.0, dated Oct. 16, 2014, 21 pages.
USPTO; Notice of Allowance & Examiner-Initiated Interview Summary issued in U.S. Appl. No. 14/175,996, mailed Oct. 16, 2014, 18 pages.
USPTO; Office Action issued in U.S. Appl. No. 14/030,958, mailed Sep. 17, 2014, 7 pages.
USPTO; Restriction Requirement issued in U.S. Appl. No. 14/175,996, mailed Jul. 7, 2014, 6 pages.
USPTO; Unpublished U.S. Appl. No. 14/508,723, filed Oct. 7, 2014.
Chinese Patent Office; 'Reexamination Decision' issued in Chinese Patent Application No. 200880009256.1, dated Nov. 25, 2014, 8 pages.
USPTO; Notice of Allowance issued in U.S. Appl. No. 14/030,958, mailed Jan. 8, 2015, 6 pages.
USPTO; Office Action issued in U.S. Appl. No. 14/508,723, mailed Jan. 14, 2015, 12 pages.
USPTO; Unpublished U.S. Appl. No. 14/596,057, filed Jan. 13, 2015.
Chinese Patent Office; 'First Office Action' issued in Chinese Patent Application No. 201210557696.9, dated Dec. 24, 2014, 8 pages.
European Patent Office; "Communication under Rule 71(3) EPC" issued in European Patent Application No. 12179714.6, dated Mar. 11, 2015, 39 pages.
Patent Cooperation Treaty; 'International Search Report' issued in PCT Application No. PCT/US2015/011405, dated Apr. 20, 2015; 2 pages.
Patent Cooperation Treaty; 'Notification of Transmittal of the International Search Report and the Written Opinion of the International Searching Authority, or the Declaration' issued in PCT Application No. PCT/US2015/011405, dated Apr. 20, 2015; 2 pages.
Patent Cooperation Treaty; 'Written Opinion' issued in PCT Application No. PCT/US2015/011405, dated Apr. 20, 2015; 10 pages.
USPTO; Corrected Notice of Allowability issued in U.S. Appl. No. 14/175,996, mailed Feb. 24, 2015, 5 pages.
Chinese Patent Office; 'Second Office Action' issued in Chinese Patent Application No. 200880009256.1, dated May 5, 2015 (includes English translation), 16 pages.
USPTO; Final Office Action issued in U.S. Appl. No. 14/508,723, mailed Jul. 15, 2015, 9 pages.
USPTO; Office Action issued in U.S. Appl. No. 14/596,057, mailed Aug. 11, 2015, 13 pages.
USPTO; Unpublished U.S. Appl. No. 14/752,657, filed Jun. 26, 2015.
USPTO; Advisory Action issued in U.S. Appl. No. 14/508,723, mailed Nov. 4, 2015, 3 pages.
USPTO; Notice of Allowance issued in U.S. Appl. No. 14/508,723, mailed Dec. 2, 2015, 8 pages.
USPTO; Office Action issued in U.S. Appl. No. 14/752,657, mailed Sep. 23, 2015, 13 pages.

* cited by examiner

SCHEME FOR DETERMINING THE LOCATIONS AND TIMING OF ADVERTISEMENTS AND OTHER INSERTIONS IN MEDIA

CROSS-REFERENCE TO RELATED APPLICATIONS

This application is a continuation of U.S. patent application Ser. No. 13/891,095, filed on May 9, 2013, entitled "SCHEME FOR DETERMINING THE LOCATIONS AND TIMING OF ADVERTISEMENTS AND OTHER INSERTIONS IN MEDIA," which is a continuation of U.S. patent application Ser. No. 11/689,982, filed on Mar. 22, 2007, now U.S. Pat. No. 8,451,380, entitled "SCHEME FOR DETERMINING THE LOCATIONS AND TIMING OF ADVERTISEMENTS AND OTHER INSERTIONS IN MEDIA," the entire disclosures of which are both hereby fully incorporated by reference herein in their entireties.

BACKGROUND OF THE INVENTION

1. Field of the Invention

The present invention relates generally to digital video processing, and more specifically to digital insertion of images and video in program content.

2. Discussion of the Related Art

One traditional form of advertising is the television commercial. Such television commercials typically consist of brief advertising spots that range in length from a few seconds to several minutes. The commercials appear between shows and interrupt the shows at regular intervals. The goal of advertisers is to keep the viewer's attention focused on the commercial, but often times the viewer will change the channel during the commercial to avoid watching the commercial.

Another way that viewers have avoided television commercials is by using digital video recorders (DVRs). With a DVR a person can record a show and then fast forward through the commercials during playback. Other media players are expected to provide viewers with even greater ability to track and skip commercials.

It is with respect to these and other background information factors, including the growth and popularity of user-created video services such as YouTube®, and the need to insert advertising in such media, that the present invention has evolved.

SUMMARY OF THE INVENTION

One embodiment provides a method for use with content, comprising: analyzing a sequence of frames of the content; determining whether an area exists in a scene depicted by the sequence of frames where additional content can be inserted without obstructing activity in the scene; for any such area, determining an amount of time that the area is available when the sequence of frames is being played; and for any such area, determining a size of the area.

Another embodiment provides a storage medium storing a computer program executable by a processor based system, the computer program causing the processor based system to execute steps comprising: analyzing a sequence of frames of content; determining whether an area exists in a scene depicted by the sequence of frames where additional content can be inserted without obstructing activity in the scene; for any such area, determining an amount of time that the area is available when the sequence of frames is being played; and for any such area, determining a size of the area.

Another embodiment provides an apparatus for use with content, comprising: a processor based system that is configured to analyze a sequence of frames of the content and determine whether an area exists in a scene depicted by the sequence of frames where additional content can be inserted without obstructing activity in the scene; wherein for any such area, the processor based system is further configured to determine an amount of time that the area is available when the sequence of frames is being played and determine a size of the area.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

When viewers avoid traditional television commercials as described above, the advertisers' messages are not received by the viewers, which is disadvantageous. Because of such disadvantages, embodiments of the present invention relate to the insertion of advertisements or other content into the television show or other program itself.

Some of the embodiments of the present invention involve an automated method for determining the timing and position of advertisements or other insertions to be placed in content. Such content may include any type of content, such as for example television shows, movies, videos, web pages, games, etc. In some embodiments, the method may operate by analyzing a sequence of video frames over time to determine clean, uncluttered, or other areas or regions in the media where the activity in the scene is not obstructed by a zone occupied by an advertisement overlay.

Figure 1:
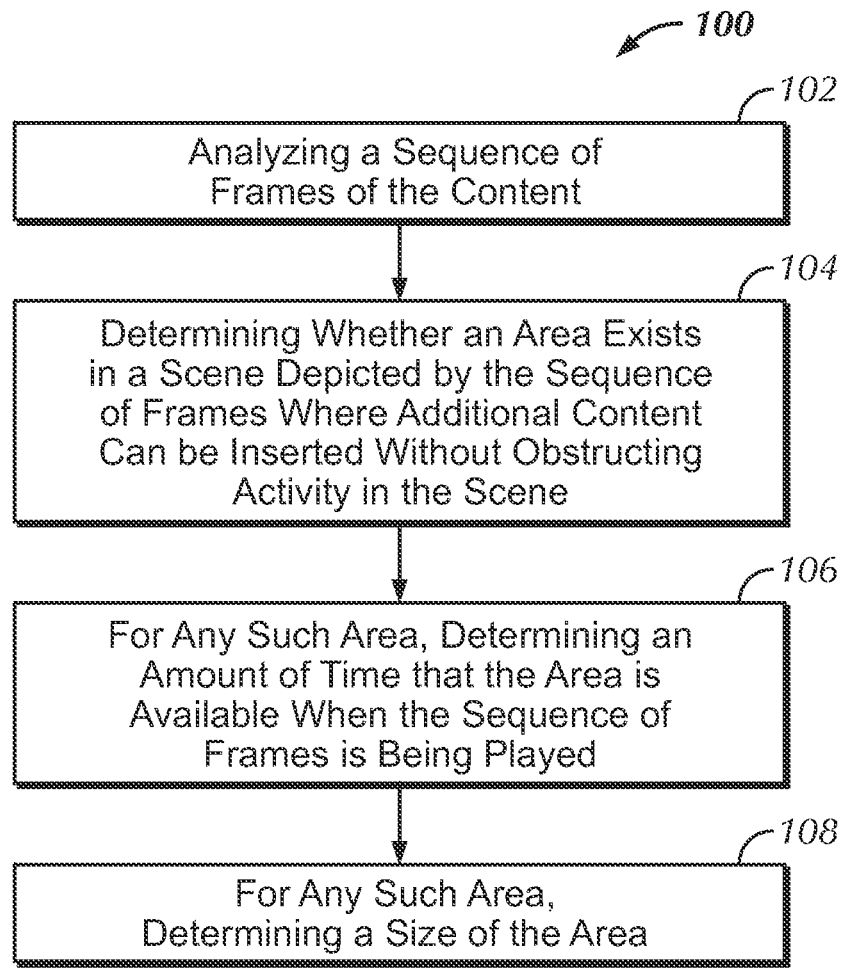
FIG. 1 is a flow diagram illustrating a method for use with content in accordance with an embodiment of the present invention.

For example, referring to FIG. 1 there is illustrated a method 100 that operates in accordance with an embodiment of the present invention. The method 100, which may be used with any type of content, begins in step 102 in which a sequence of frames of the content is analyzed. By way of example, video analysis of the sequence of video frames may be used to determine appropriate locations to deposit advertisements or other graphics into the media. In some embodiments, such analysis may be automatically conducted on a frame-by-frame basis.

In step 104, it is determined whether an area exists in a scene depicted by the sequence of frames where additional content can be inserted without obstructing activity in the scene. In some embodiments this may be done by going through the video frame-by-frame to identify where movement is happening or regions of voids. For example, there may be people and action happening on one side of the screen, but no movement on the other side of screen. The area of no movement may be an appropriate place to insert an advertisement or other additional content.

In step 106, for any area identified as appropriate for receiving additional content, the amount of time that the area is available when the sequence of frames is being played is determined. And in step 108, the size of any identified area is determined As such, a system implementing this method may determine whether or not the region of no activity is large enough to fit an advertisement.

The method 100 may be performed automatically by any type of computer or processor based system. Such a system may conduct a frame-by-frame analysis over time to track the action in the scenes and mark the blocks of video that are appropriate for the insertion of advertisements or other images or content. In some embodiments, the frame-by-frame analysis may be conducted by image analysis software.

Thus, in some embodiments a system looks at the frames in the video and identifies the locations in the video where there is activity and where there is no activity. In a simple scenario the camera is fixed and the actors are moving. That is, the sequence of frames comprises a representation of video shot by a fixed camera. In a more complex scenario, the camera is moving or panning across the scene, which includes fixed objects, as well as moving objects. That is, the sequence of frames comprises a representation of video shot by a moving camera.

Figure 2A:
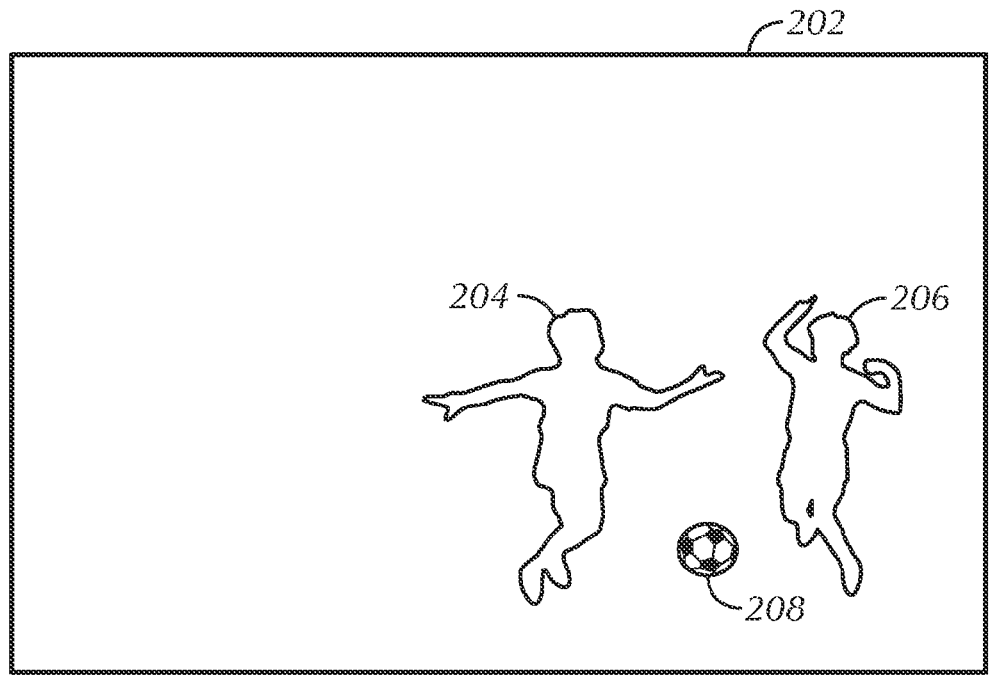
FIGS. 2A and 2B are screen shots illustrating an example application of the method of FIG. 1 in accordance with an embodiment of the present invention.

FIG. 2A illustrates an example of the fixed camera scenario. In this example the frame boarder 202 represents each frame in the sequence of frames because the camera is fixed. If two children 204, 206 are playing with a soccer ball 208 on the right side of the screen, an advertisement may be placed on the other side of the screen so as not to obstruct the view of the children playing with the soccer ball. This way, an advertisement may be deposited in the scene so as not to obstruct a view of the moving objects or activity, i.e. the children 204, 206 playing with the ball 208.

Figure 2B:
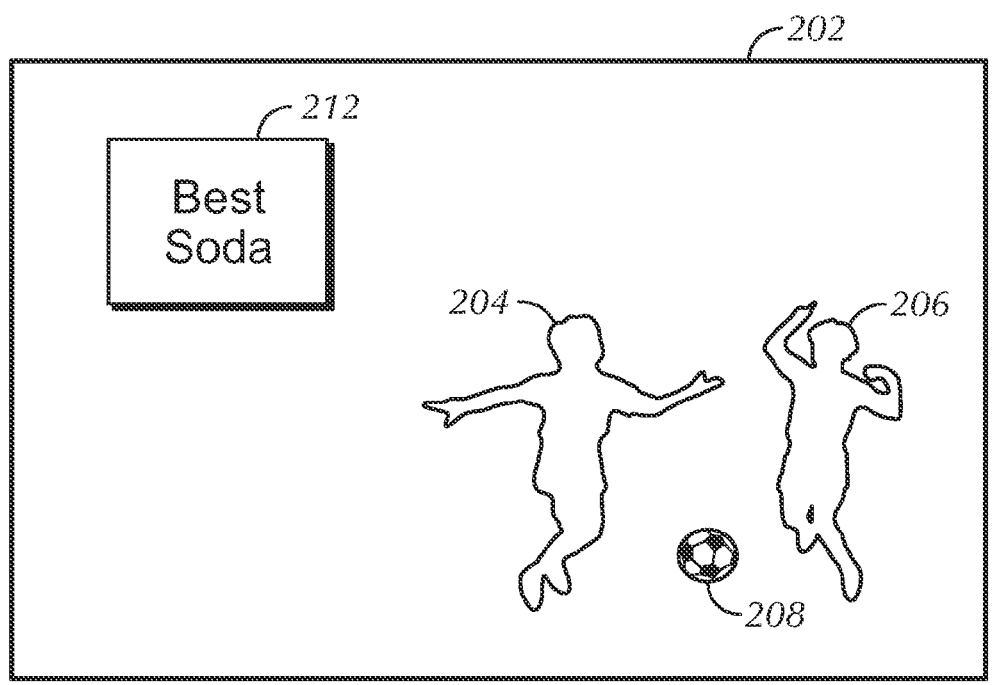

FIG. 2B illustrates an advertisement 212 for "Best Soda" that has been inserted into the scene. Because the two children 204, 206 are playing with the soccer ball 208 are still visible, the activity in connection with the focus of the video has not be obstructed by the advertisement 212. That is, the primary or target or moving objects in the scene are not obstructed by the advertisement 212.

In some embodiments, in analyzing the frames the system may mark a frame or part of a frame as not able to receive an advertisement because there is too much movement. Such frames or portions of frames may be referred to herein as too "dirty." Thus, in the present example the system may block out the portions of the frames associated with the children 204, 206 playing with the soccer ball 208 so that those spaces are not used for the placement of advertisements or other insertions.

As another example, all of the actors and movement in a certain scene may be located on the left side of the screen. As such, the system may block out the portions of the frames corresponding to the actors on the left side of the screen and may indicate that advertisements cannot be placed there. That is, advertisements cannot be placed on the left side of the screen because there are people moving and things are happening on the left side of the screen. Meanwhile, however, the right side of the screen may be clean, and it may have been clean for a certain period of time that may be sufficient for the placing of an advertisement.

In some embodiments, scenes may contain metadata that characterize information about the frames and including the history and momentum of objects moving in the frames, and some embodiments of the present invention may utilize such metadata to determine the potential regions in which content, including advertisements, may be placed in the scene.

In some embodiments, the step of determining if a frame is "dirty" or if a frame region is "dirty" may be performed by analyzing the frame data across one or more frames. Fixed or variable thresholds may be used in the determination of objects of interest and regions of interest. In some embodiments the system may also encode or create metadata as mentioned above for enabling playback system insertion of content.

Figure 3A:
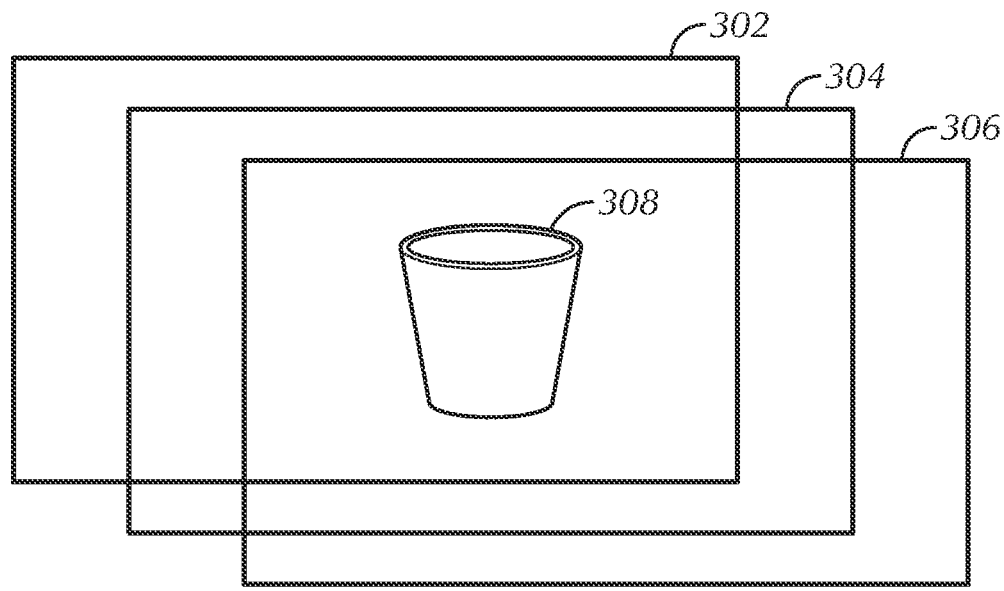
FIGS. 3A and 3B are screen shots illustrating another example application of the method of FIG. 1 in accordance with an embodiment of the present invention.

FIG. 3A illustrates an example of the moving camera scenario. In this example the frame boarders 302, 304, 306 represent three of the frames in the sequence of frames as the camera moves. Because the camera is moving or panning across the scene, a fixed object such as a trash can 308 will appear to be slowly sliding over the background of the scene. The trash can 308 has this appearance because it is positioned toward the right side of frame 302, near the center of frame 304, and then towards the left side of frame 306. With the camera slowly panning across the set, and the objects in the scene are fixed on the set, each frame looks dirty because there is constant movement.

However, by reviewing the frames of the video, the system may determine that the camera is moving, the people within the scene are moving, but that the trash can 308 is fixed. As such, a space on the trash can 308 may be free to use for an advertisement or other image or graphics because the trash can itself is largely fixed.

Figure 3B:
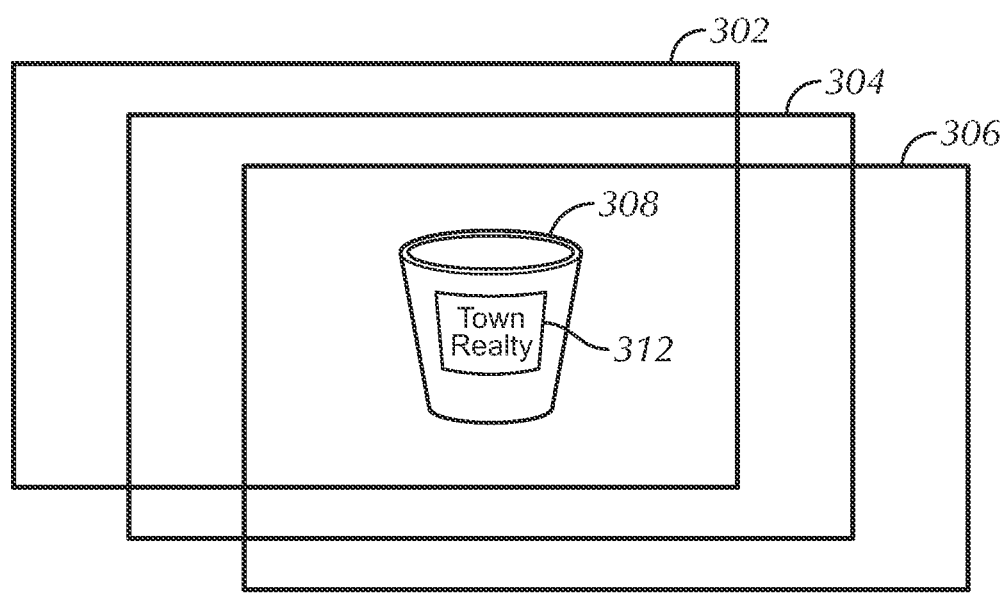

FIG. 3B illustrates an advertisement 312 for "Town Realty" that has been inserted into the scene on the trash can 308. In this example, the trash can 308 comprises an area in the scene where additional content can be inserted without obstructing activity in the scene. Thus, in some embodiments in the scenario where the camera is moving or panning, the system may identify the fixed objects, and then identify how an advertisement may be overlaid onto the fixed objects. In some embodiments, this may be done by moving a fulcrum along the frame to filter out the fixed objects from the moving objects. Namely, the system may slide the point of perspective as to where the reference elements are located within a frame so that the camera movements can be filtered out from the actual actors moving in the scene.

As mentioned above, the method 100 (FIG. 1) includes step 106 for determining the amount of time that the area is available when the sequence of frames is being played, and step 108 for determining the size of the area. For example, a system may determine that the right side of the screen may be free for a certain amount of time, and it may be free to a certain dimension for that amount time. This information may be important for choosing an advertisement because that dimension may be capable of taking an advertisement with a certain maximum size. And furthermore, that dimension may only be available for a certain amount of time, such as for example 2, 5, 15, 20, etc. seconds.

In some embodiments, the system may search the frames in the sequence of frames for a large enough region or space to hold an advertisement of a certain size. The system may also search for a long enough length of time in the video to place a certain advertisement. For example, a certain advertisement may need 15 seconds of free and clear region for placement of the advertisement. The system may do this by determining how long each empty region in the video will last.

In some embodiments, the system may use the determined time and size information to look across a database of advertisements and select an advertisement that is appropriate for the available dimensions and available amount of time. Thus, in some embodiments there is a profiling of video sequences, and then there is a database look-up for an advertisement based on how much time and space is available for the advertisement. For example, in some embodiments a system may determine how much time is available in the video for an occlusion free zone. Then, the database look-up determines whether or not the size of occlusion free zone and the time available meet the requirements for any advertisements that are in the database.

Other factors may or may not be used in choosing the specific advertisement. For example, in some embodiments, the system may simply choose the next advertisement that meets the maximum time available and maximum size available.

Or, in some embodiments the system may choose an advertisement that maximizes the revenue that can be generated from selling the advertisement space. Various different sizes and types of advertisements may maximize the dollar return for the available advertisement space. For example, maximum revenue may be generated by filling the space with several smaller advertisements, or filling the space with one large advertisement. In some embodiments, the system may analyze the space and time available to maximize the dollar revenue based upon those specifications.

In some embodiments, the system may use methods for ordering the selection of the advertisements to meet economic business models. For example, the system may use a priority scheme for selecting the advertisements. As another example, several small advertisements may be used to optimize the available space, which may generate more revenue than one large advertisement. With any such scenario the system may still determine whether or not the next chosen advertisement meets the determined time and size specifications.

Therefore, embodiments of the present invention provide methods for determining the location and timing of advertisements and other content placed in media. Embodiments of the present invention may be used to automatically find blank spaces or voids in video into which advertisements or other content may be inserted. That is, a video may be run through a process according to an embodiment of the present intention to automatically find the blank spaces or voids in the video into which advertisements may be inserted. For example, a ten second clip of video may include two seconds of blank or black screen. In this example, the whole screen may be available for an advertisement for two seconds. Thus, twenty-percent of the ten second video may be populated with advertisements or other content.

It should be well understood that other types of content and not just advertisements may be inserted into the blank spaces or voids. For example, other type of graphics, images, pictures, etc. may comprise the additional content that may be inserted into the areas where additional content can be inserted without obstructing activity in the scene.

Figure 4:
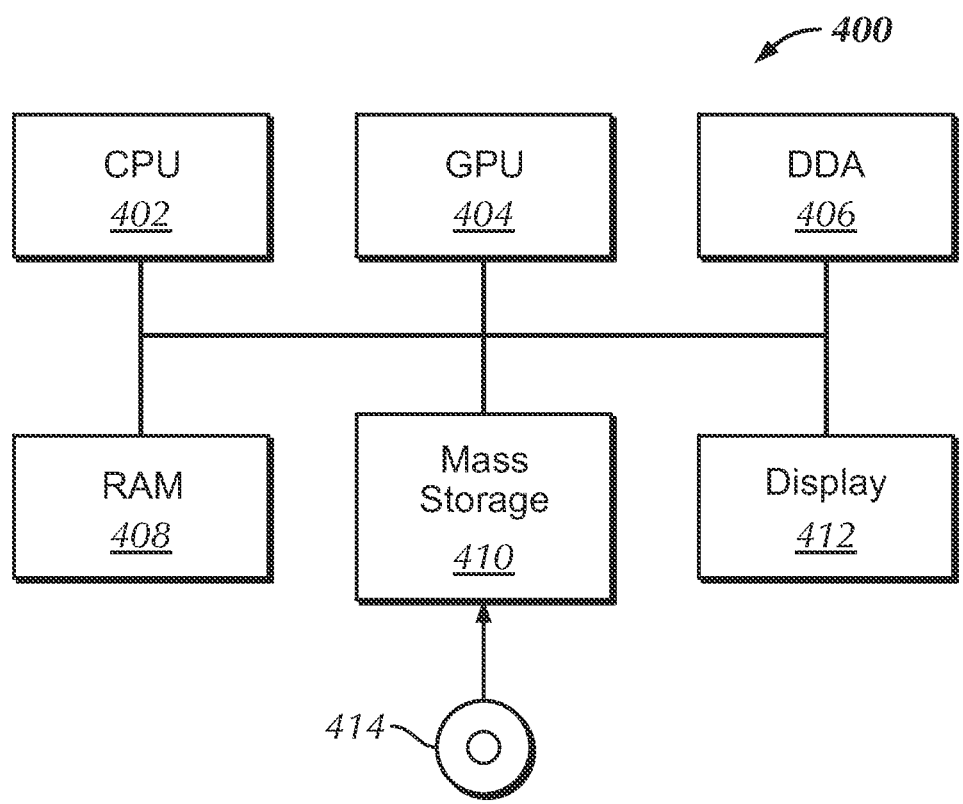
FIG. 4 is a block diagram illustrating a processor based system that may be used to run, implement and/or execute the methods and/or techniques shown and described herein in accordance with embodiments of the present invention.

The methods and techniques described herein may be utilized, implemented and/or run on many different types of systems, computers, graphics workstations, televisions, entertainment systems, video game systems, DVD players, DVRs, media players, home servers, video game consoles, and the like. Referring to FIG. 4, there is illustrated a system 400 that may be used for any such implementations. One or more components of the system 400 may be used for implementing any system mentioned above. However, the use of the system 400 or any portion thereof is certainly not required.

By way of example, the system 400 may include, but is not required to include, a central processing unit (CPU) 402, a graphics processing unit (GPU) 404, digital differential analysis (DDA) hardware 406, a random access memory (RAM) 408, and a mass storage unit 410, such as a disk drive. The system 400 may be coupled to, or integrated with, a display 412, such as for example any type of display, including any of the types of displays mentioned herein. The system 400 comprises an example of a processor based system.

The CPU 402 and/or GPU 404 may be used to execute or assist in executing the steps of the methods and techniques described herein, and various program content and images may be rendered on the display 412. Removable storage media 414 may optionally be used with the mass storage unit 410, which may be used for storing code that implements the methods and techniques described herein. However, any of the storage devices, such as the RAM 408 or mass storage unit 410, may be used for storing such code. Furthermore, any of the storage devices, such as the RAM 408 or mass storage unit 410, may be used for storing the database described above. Either all or a portion of the system 400 may be embodied in any type of device, such as for example a computer, workstation, television, video game console or system, or any other type of device, including any type of device mentioned herein.

While the invention herein disclosed has been described by means of specific embodiments and applications thereof, numerous modifications and variations could be made thereto by those skilled in the art without departing from the scope of the invention set forth in the claims.

What is claimed is:

1. A method, comprising:
analyzing a sequence of frames of content;
based on the analyzing, determining information about objects moving in the frames;
creating metadata comprising the information about objects moving in the frames that can be used to determine whether an area exists in a scene depicted by the sequence of frames where additional content can be inserted without obstructing an activity in the scene;
using the metadata to determine whether an area exists in the scene where additional content can be inserted without obstructing the activity in the scene;
for any such area, determining a size of the area;
selecting the additional content based at least in part on an analysis of the size of the area to determine between displaying only one advertisement and displaying a plurality of advertisements together in the area; and
in response to determining to display a plurality of advertisements, causing the plurality of advertisements to be displayed together in the area in the scene.

2. The method of claim 1, further comprising:
encoding the content with the metadata.

3. The method of claim 1, further comprising:
configuring the metadata and the content to be provided to a playback system for insertion of content.

4. A non-transitory storage medium storing a computer program executable by a processor based system, the computer program causing the processor based system to execute steps comprising:
analyzing a sequence of frames of content;
based on the analyzing, determining information objects moving in the frames;

creating metadata comprising the information about objects moving in the frames that can be used to determine whether an area exists in a scene depicted by the sequence of frames where additional content can be inserted without obstructing an activity in the scene;

using the metadata to determine whether an area exists in the scene where additional content can be inserted without obstructing the activity in the scene;

for any such area, determining a size of the area;

selecting the additional content based at least in part on an analysis of the size of the area to determine between displaying only one advertisement and displaying a plurality of advertisements together in the area; and in response to determining to display a plurality of advertisements, causing the plurality of advertisements to be displayed together in the area in the scene.

5. The non-transitory storage medium in accordance with claim 4, wherein the computer program further causes the processor based system to execute steps comprising:

encoding the content with the metadata.

6. The non-transitory storage medium in accordance with 4, wherein the computer program further causes the processor based system to execute steps comprising:

configuring the metadata and the content to be provided to a playback system for insertion of content.

7. An apparatus for use with content, comprising:

a processor based system that is configured to analyze a sequence of frames of content and, based on the analyzing, determine information about objects moving in the frames;

wherein the processor based system is further configured to create metadata comprising the information about objects moving in the frames that can be used to determine whether an area exists in a scene depicted by the sequence of frames where additional content can be inserted without obstructing an activity in the scene; and wherein the metadata is used to determine whether an area exists in the scene where additional content can be inserted without obstructing the activity in the scene, and for any such area, a size of the area is determined; and wherein the additional content is selected based at least in part on an analysis of the size of the area to determine between displaying only one advertisement and displaying a plurality of advertisements together in the area, and in response to determining to display a plurality of advertisements, the plurality of advertisements is caused to be displayed together in the area in the scene.

* * * * *

UNITED STATES PATENT AND TRADEMARK OFFICE
CERTIFICATE OF CORRECTION

| | | |
|---|---|---|
| PATENT NO. | : 9,237,258 B2 | Page 1 of 1 |
| APPLICATION NO. | : 14/151536 | |
| DATED | : January 12, 2016 | |
| INVENTOR(S) | : Gary M. Zalewski | |

It is certified that error appears in the above-identified patent and that said Letters Patent is hereby corrected as shown below:

In the Claims, Column 6, Line 66, Claim 4, after the word "information" insert --about--.

Signed and Sealed this
Third Day of May, 2016

Michelle K. Lee
*Director of the United States Patent and Trademark Office*